(12) United States Patent
Valtiner-Zuegg et al.

(10) Patent No.: US 9,393,497 B2
(45) Date of Patent: Jul. 19, 2016

(54) ENTERTAINMENT DEVICE COMPRISING SUSPENDED SIMULATION PLATFORM

(71) Applicant: VALTINER & PARTNER, ZT-GMBH, Lienz (AT)

(72) Inventors: Saskia Valtiner-Zuegg, Lienz (AT); Martin Valtiner, Lienz (AT)

( * ) Notice: Subject to any disclaimer, the term of this patent is extended or adjusted under 35 U.S.C. 154(b) by 0 days.

(21) Appl. No.: 14/428,104

(22) PCT Filed: Aug. 16, 2013

(86) PCT No.: PCT/AT2013/000134
§ 371 (c)(1),
(2) Date: Mar. 13, 2015

(87) PCT Pub. No.: WO2014/043727
PCT Pub. Date: Mar. 27, 2014

(65) Prior Publication Data
US 2015/0224411 A1    Aug. 13, 2015

(30) Foreign Application Priority Data
Sep. 21, 2012    (AT) .................................. A 1035/2012

(51) Int. Cl.
*A63G 31/16*    (2006.01)
*G09B 9/00*    (2006.01)
*A63J 25/00*    (2009.01)

(52) U.S. Cl.
CPC .................. *A63G 31/16* (2013.01); *A63J 25/00* (2013.01); *G09B 9/00* (2013.01)

(58) Field of Classification Search
CPC ..... A63G 21/00; A63G 21/212; A63G 31/00; A63G 3/16; G09B 9/00; A63J 25/00

USPC .............. 472/59, 60, 61, 62, 130; 434/29, 55
See application file for complete search history.

(56) References Cited

U.S. PATENT DOCUMENTS

| 1,789,680 A | 1/1931 | Gwinnett |
| 4,066,256 A | 1/1978 | Trumbull |
| 4,790,527 A | 12/1988 | Browning |
| 4,885,878 A * | 12/1989 | Wuu ......................... E04H 3/22 348/121 |
| 5,584,697 A | 12/1996 | Trumbull |
| 5,931,739 A | 8/1999 | Layer et al. |

(Continued)

FOREIGN PATENT DOCUMENTS

| DE | 3602939 A1 | 8/1987 |
| DE | 102009019628 A1 | 2/2010 |

(Continued)

*Primary Examiner* — Kien Nguyen
(74) *Attorney, Agent, or Firm* — Laurence A. Greenberg; Werner H. Stemer; Ralph E. Locher (57) ABSTRACT

An entertainment device includes a screen on which a film can be shown, a movable simulation platform, a multiplicity of audience places or locations disposed on the simulation platform, each place or location having a supporting element for spectators to lean against, a drive device for moving the simulation platform, and a controlling or regulating unit for controlling or regulating the movement of the simulation platform. The movable simulation platform can be moved by the drive device under control of the controlling or regulation unit in dependence on a motion data track corresponding to the film. The simulation platform is suspended from cables which can be moved by the drive device.

28 Claims, 7 Drawing Sheets

(56) References Cited

U.S. PATENT DOCUMENTS

| | | |
|---|---|---|
| 6,533,670 B1 | 3/2003 | Drobnis |
| 8,147,344 B2 * | 4/2012 | Crawford ............... A63G 21/20 104/112 |
| 8,899,986 B2 | 12/2014 | Glueck |
| 8,920,251 B2 | 12/2014 | Dietz et al. |
| 2005/0014567 A1 | 1/2005 | Li et al. |

FOREIGN PATENT DOCUMENTS

| | | |
|---|---|---|
| EP | 1311330 B1 | 12/2008 |
| EP | 2394720 A2 | 12/2011 |
| EP | 2572766 A1 | 3/2013 |
| WO | 2007057171 A2 | 5/2007 |

\* cited by examiner

Fig. 1

ENTERTAINMENT DEVICE COMPRISING SUSPENDED SIMULATION PLATFORM

BACKGROUND OF THE INVENTION

Field of the Invention

The invention relates to an entertainment device comprising a screen, on which a film can be shown, a movable, suspended simulation platform, a multiplicity of viewing places, arranged on the simulation platform and each having a supporting element for those watching to lean against, a drive device for moving the simulation platform and a controlling or regulating unit for controlling or regulating the movement of the simulation platform, the movable simulation platform being movable by the drive device, under the control of the controlling or regulating unit, in dependence on a motion data track corresponding to the film. The invention also relates to a movie theater (cinema) with such an entertainment device.

In order to create a more realistic effect for people when playing movies or showing films, for some time already there have been various devices for also moving the person watching the film along with the action. This produces an even more realistic feeling for the person watching.

Devices of a different generic type, that serve only for flight simulation, are known from DE 36 02 939 C2 and DE 10 2009 019 628 A1, the respective aircraft being suspended. In the case of DE 10 2009 019 628 A1, the suspension takes place on a crane system with one or more cables or by means of a cross member with a tilting joint. There is therefore no cable control, but instead a trolley moves the helicopter. The suspension by means of the cables serves only for fixing and not for control. A number of cabins can be suspended to such a crane system. Without the crane system, the entire movement does not work. On account of the superstructure for the rotor, lateral loading and unloading is not possible. DE 39 02 939 C2 shows an aircraft model that runs on a rail system and is pulled by a cable. Lateral movement for loading and unloading is not possible. A vertical upward and downward movement is not mentioned either. These two devices are not concerned with entertainment but with the simulation of flying behavior. The movement of these aircraft does not take place in dependence on the film, but rather in dependence on the control movements carried out by the operator. There is no movement in dependence on a motion data track corresponding to a film. Such a flight simulator can only be used by expert personnel, since it is a professional training apparatus that requires specialist knowledge to operate it. Any special effects, if at all, occur outside the aircraft or helicopter cabin.

EP 2 394 720 A2 discloses a traveling device of a different generic type without a screen that can be moved along rails and is suspended from cables. The same also applies to the ride described in the subsequently published EP 2 572 766 A1.

Another entertainment structure of a different generic type is disclosed by U.S. Pat. No. 4,790,527. In that case, a spiral walkway is suspended from cables, people being able to move freely on the walkway. Lateral movement of the walkway is not possible. Under this walkway there is a horizontally disposed screen. The structure is not well designed and is dangerous, since the individual people watching are not allocated viewing places and the safety of those watching is not ensured if strong movements occur. In addition, there are no seats and no supporting elements to lean against. Movement that takes place in dependence on a motion data track is not described either.

On the other hand, entertainment devices comprising a screen, a simulation platform, supporting elements to lean against, a drive device and a controlling or regulating unit that controls movement are disclosed by U.S. Pat. No. 5,931,739, WO 2007/057171 A2 and US 2005/0014567 A1, such a device usually being used in amusement parks. In these cases, the drives for the movement of the simulation platform are in each case underneath the platform. A disadvantage of these devices is that, the greater the radius of movement for such a platform is intended to be, the more complicated and larger these drive devices, which are usually hydraulic, also have to be made. Further devices of this type are also disclosed by EP 1 311 330 B1, U.S. Pat. No. 4,066,256 and U.S. Pat. No. 1,789,680.

These disadvantages also apply, however, in a similar way to the generic U.S. Pat. No. 5,584,697, in which the platform is suspended by means of unwieldy and complicated piston-cylinder units.

BRIEF SUMMARY OF THE INVENTION

The object of the present invention is to provide an entertainment device that is an alternative to the prior art or is improved in comparison with the prior art. In particular, it is intended to simplify or improve the possibilities for movement of a simulation platform with a multiplicity of viewing places, each with a supporting element for those watching to lean against.

This is achieved by an entertainment device comprising a screen on which a film can be shown, a movable, suspended simulation platform, a multiplicity of viewing places disposed on the simulation platform and each having a supporting element for those watching to lean against, a drive device for moving the simulation platform and a controlling or regulating unit for controlling or regulating the movement of the simulation platform, the movable simulation platform being movable by the drive device under the control of the controlling or regulating unit, in dependence on a motion data track corresponding to the film, the simulation platform being suspended from cables being movable by the drive device. The invention accordingly provides that the simulation platform is suspended from cables, the cables being movable by the drive device. Consequently, the simulation platform is freely suspended in space and can be moved easily by means of the drive device. The cables ensure a smooth movement, which is perceived by the users as extremely comfortable, since jerky changes in direction are all but ruled out. This also promotes the safety for the patrons standing on the simulation platform. The movement of the simulation platform is adapted to the action in the film. All of the passengers consequently see the same film and cannot influence the action in the film or the movement of the simulation platform. The suspension allows the simulation platform also to be moved horizontally over large sections or else allows rotations about a vertical axis to be performed. Various devices for special effects, which enhance the experience of watching the film by means of various actions (wind, water spray, etc.) may also be fitted in front of, over and on the platform.

In order to achieve a stable form of the suspended simulation platform, it is preferably provided that the simulation platform has a baseplate, preferably having steps, and a number of lateral uprights, preferably three. If appropriate, the simulation platform may additionally also have cross members connecting the uprights in the upper region.

For a well-functioning movement of the simulation platform, it is preferably provided that the simulation platform is suspended from cables by means of precisely three fastening points. It is in this case preferably provided that the cables, preferably six, can each be wound up and unwound at one end on a cable reel, are fastened at the other end to the simulation platform—either directly to the baseplate, to the cross members or to the uprights—and in between run over a deflecting roller. The system with deflecting rollers and cable drums produces a comparatively compact installation height. Depending on the configuration, it is also possible to dispense with the deflecting roller. The cables are preferably fastened to the structure (uprights) of the platform by means of a metal construction of a triangular form (cross members). It is also preferably provided that the drive device has six motors, each driving a cable reel, the drive then taking place by means of six cables that are controlled by the six motors, over six deflecting rollers. The motors are not necessarily attached to the underside of the simulation platform—as in the case of other systems—but may also be attached laterally at any height of the frame construction or else over it. The deflecting rollers also have the effect that the force is always used uniformly. Consequently, instead of the previously often used liquid- or air-dependent systems (pneumatic or hydraulic systems) for the drive device, a simpler drive variant is ensured by the electric motors. Preferably, counterweights may also be used for the drive device—especially for the individual motors—for example on the cables.

It may also preferably be provided that, by using a special technique (a regenerative feedback module or DC link system), when there are certain sequences of movement, the motors generate energy that can be fed back to the system. Ideally, therefore, no power is drawn from the grid.

Two of the six cables are each fastened to the simulation platform at a common fastening point, whereby improved and simplified movement of the simulation platform is possible. Moreover, it may be provided in this respect that six anchoring points of the cables, preferably lying on the deflecting rollers, lie substantially in a horizontal plane. In order to carry out this movement in a way that is as balanced and energy-efficient as possible, it is also preferably provided that the first three anchoring points, respectively assigned to different fastening points, the second three anchoring points, respectively assigned to different fastening points, and the three fastening points are arranged in the form of three, preferably equilateral, triangles, the centers of gravity of the three triangles lying in a vertical line. This novel form of driving and suspension allows the simulation platform to move with six degrees of freedom. As a result, the action in the film can be followed with greater realism.

If the entertainment device is installed in a space within a cinema or movie theater in an amusement park, the spatial boundaries can form a framework for the entertainment device as a whole. It is preferably provided that the entertainment device also comprises a separate frame with a baseplate, a number of lateral uprights, preferably four, and a top element. For efficient movement of the simulation platform, it is in this case preferably provided that at least one deflecting roller per cable is rotatably mounted on the frame, preferably on its top element. The motors or the drive device are/is preferably arranged underneath the baseplate of the frame. The frame construction of the drive system may be erected with a height that is adapted to the building, and consequently allows an individually adapted space for movement, even over a number of stories.

The simulation platform may in principle be built in two variants. On the one hand, as an open simulation platform with the film projected onto a static big screen. The static system is independent of the supporting structure of the object and the load per unit area is no greater than the usual allowance in the basic dimensioning of buildings. On the other hand, there can also be an enclosed type of construction (capsuled ride), in which the projection onto screens takes place onto a structure that is in front of and moves along with the simulation platform. The screen mentioned above is understood as meaning both a video wall with a multiplicity of LED light points and a screen as a projection area for a film projector. In the case of a capsuled ride, a video wall is preferably used.

In the case of conventional systems, the simulation platform and the special effects have previously been activated by means of dedicated programming (motion file). This is a time-consuming and costly process, which especially makes the changing of films difficult and more expensive. In order to prevent this, it is now preferably provided that the controlling or regulating unit has a storage device in which the motion data track is stored, the film data track, from which the film can be played, also being stored in the storage device in parallel with the motion data track. The innovation is consequently especially that of a specially configured interface, by which the necessary items of motion information are made available directly on a separate film track. This film data track can be worked on at the same time as the film is shot. As a result, subsequent adaptation/programming of the film to the simulation platform is superfluous. The positional data for the platform are transmitted to the controlling or regulating unit of the platform in real time during the performance. This unit then converts these positional data into platform-specific motor positions and performs the movements. This concept allows the film to be changed relatively quickly and uncomplicatedly. By contrast with other programming systems, reprogramming of a motion file is no longer necessary. This allows a change of film to be performed in an extremely short time, while this previously necessitated laborious reprogramming of the movement of the simulation platform.

For easy handling and easy changing of the motion data track and the film data track, it is preferably provided that the storage device takes the form of a mobile data carrier, preferably a CD or DVD.

In general it is possible that the film projector is mounted on the frame or is otherwise spatially fixed, that is to say independent of the simulation platform. According to the first variant, the film projector is an integral part of the simulation platform and, as a result, is arranged directly on the simulation platform. Moreover, a movement mechanism for the film projector is provided, developed specifically for it. The projector (focus) moves in coordination with the simulation platform, in order to achieve optimum utilization of the projection area. By contrast with rigid fixing of the projector, better utilization of the spatial height can consequently be achieved. This makes installation in existing buildings much easier.

An important part of the overall film experience is also provided by the supporting elements for leaning against. Although these may take the form of seats with backrests, these supporting elements are preferably formed as a kind of flying rail. Leaning against this whilst standing, the person watching enjoys a completely novel flying experience. These flying rails may also be provided with various special effects (LED lighting, mist, wind, smell, water spray, vibration, etc.). These supporting elements may be statically connected to the baseplate of the simulation platform. However, it may also optionally be provided that these supporting elements or flying rails move in relation to the baseplate of the simulation platform synchronously with or in dependence on the film. Appropriate forward and rearward pivoting of these supporting elements enhances the entertainment factor.

Protection is also afforded to a movie theater with an entertainment device according to the invention. One particular advantage of the suspended simulation platform is provided by the greater possibilities for movement. This allows a much better possibility of utilizing a building, since the passengers can enter and leave the simulation platform on two different levels. This makes it easier to organize the flows of patrons and to put on a pre-show and a post-show. Accordingly, the movie theater preferably has an access area to the simulation platform, arranged at a first level of the movie theater, and a leaving area from the simulation platform, arranged at a second level of the movie theater, at a different height from the first level, the simulation platform being vertically movable between the access area and the leaving area.

BRIEF DESCRIPTION OF THE SEVERAL VIEWS OF THE DRAWING

Further details and advantages of the present invention are explained in more detail below on the basis of the description of the figures with reference to the exemplary embodiments that are represented in the drawings, in which.

DESCRIPTION OF THE INVENTION

Figure 1:
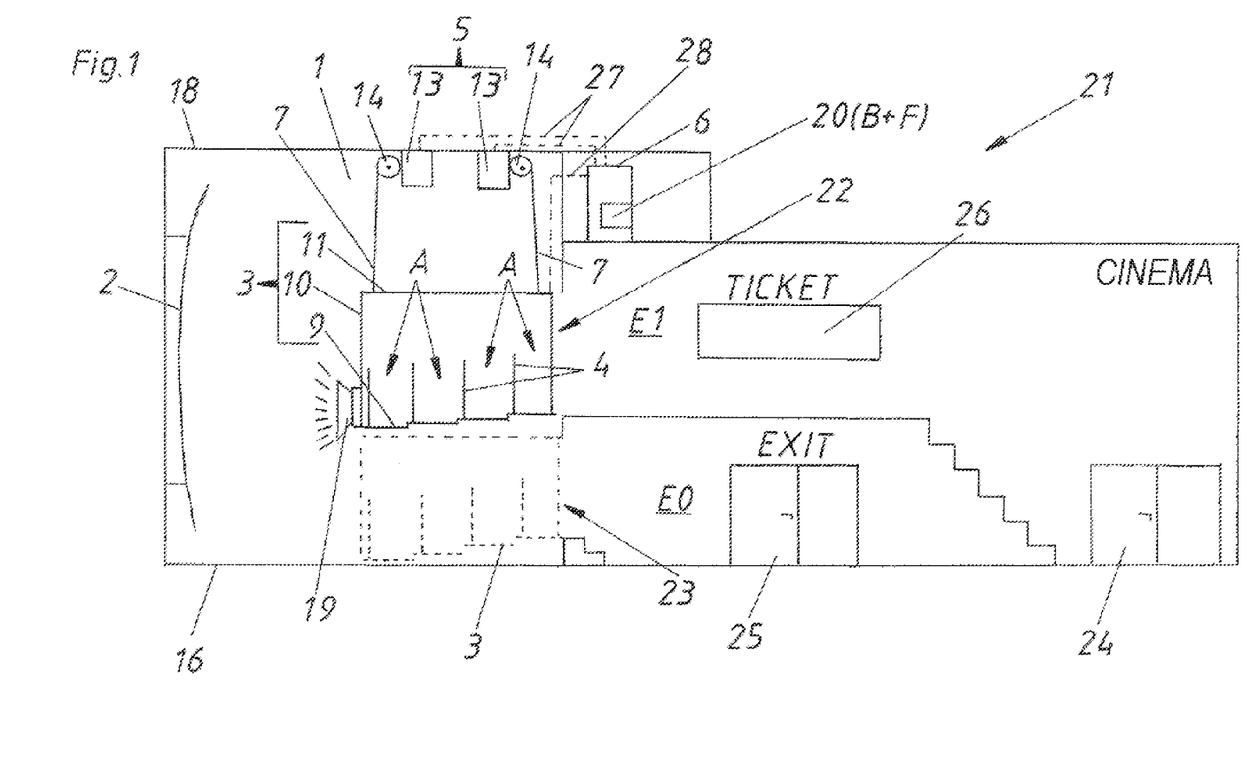
FIG. 1 schematically shows a movie theater with an entertainment device.

In FIG. 1, a movie theater 21 (cinema) is schematically represented. A patron in this case enters the movie theater 21 through the entrance door 24 and goes up the steps to the first level E1. There, an entry ticket can be bought at the ticket counter 26. After that, the person who has come to see the film proceeds onto the simulation platform 3 via the access area 22. The patron selects a viewing place A respectively allocated for a person watching and holds firmly onto a supporting element 4 or leans against a supporting element 4 (flying rail).

In order to ensure an unobstructed view of the screen 2, the baseplate 9 of the simulation platform 3 is provided with steps 8. Also arranged at the periphery of the baseplate 9 are vertical uprights 10, which in the upper region are connected by means of the cross members 11. Fastened to these cross members 11 are the cables 7, which are driven by the drive device 5. The cables 7 in this case run respectively over a deflecting roller 14 arranged in the region of the ceiling of the room (top element 18). It is also possible for a cable reel 12 to be driven directly—without a deflecting roller 14—by the motors 13. In this FIG. 1, the motors 13 are arranged above the platform 3. They may however also be arranged underneath the platform 16 or on the platform 16.

The controlling or regulating unit 6 is provided for controlling or regulating the movement of the simulation platform 3. A storage device 20, on which at least one motion data track B is stored, is integrated in this controlling or regulating unit 6 or can be inserted. In addition, a film data track F may also be stored in parallel with the motion data track B. In dependence on this stored motion data track B, the drive device 5 is controlled by means of the signal lines 27. In parallel with this, the film data track F is transmitted by means of the signal line 28 to the film projector 19 arranged on the simulation platform 3. As soon as the showing of the film begins, the drive device 5 causes the simulation platform 3 to move in accordance with the film shown on the screen 2.

After the showing of the film is ended, the entire simulation platform 3 is moved down and arrives at the position represented by dashed lines on the second level E0. The patrons can then leave the simulation platform 3 via the leaving area 23. They can then leave the movie theater 21 again directly through the exit door 25. Of course, depending on the space available, the access area 22 and the leaving area 23 may also be arranged differently (for example next to one another or else not separate from one another at all).

Figure 2:
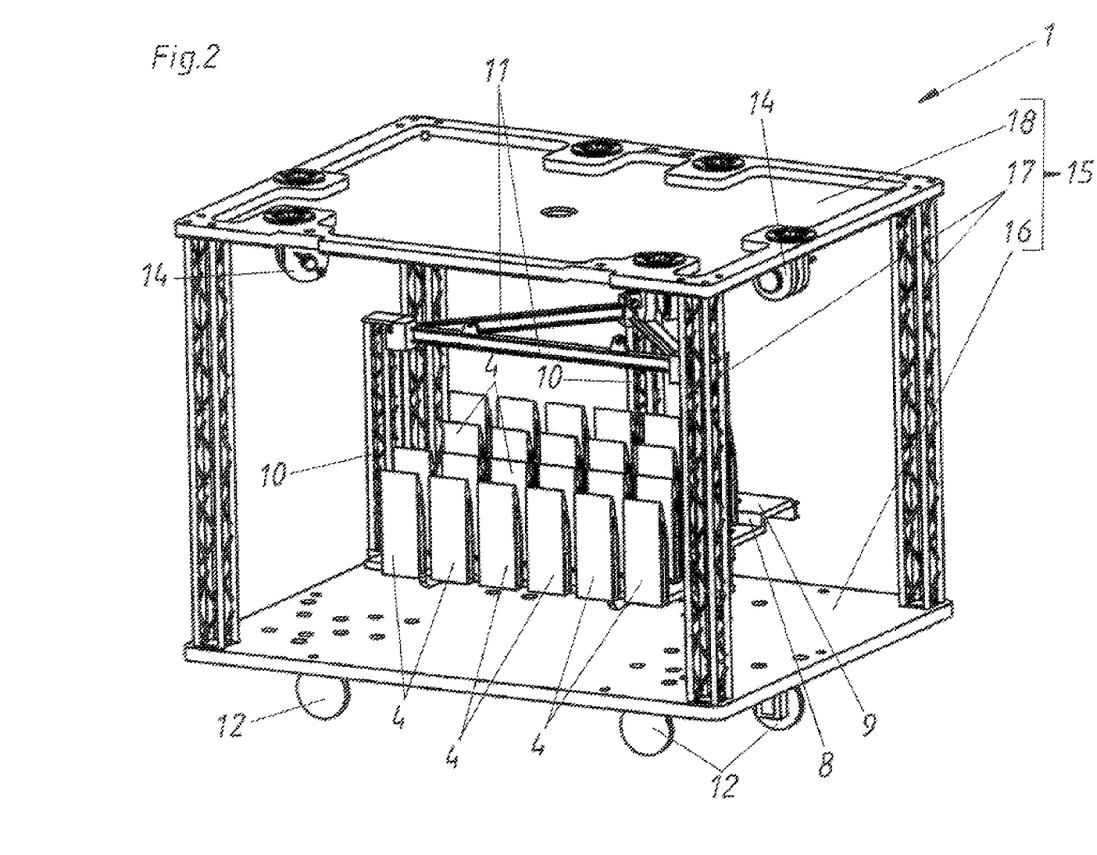
FIG. 2 shows an entertainment device together with a frame.

Further details of the entertainment device 1 are represented in FIG. 2. Here the simulation platform 3 is arranged in a frame 15, consisting of the baseplate 16, the four uprights 17 and the top element 18, and is suspended from cables 7 that are not represented here. It can also be seen in this FIG. 2 that the cable reels 12 driven by the motors 13 are arranged underneath the baseplate 16. The cables pass through openings in the baseplate 16 to the deflecting roller 14, and from there to the fastening points P1, P2 and P3 on the cross members 11. In this simulation platform 3 that is represented in FIG. 2, altogether twenty two supporting elements 4 are arranged in the form of flying rails. Each of these supporting elements 4 is assigned a viewing place A for a person watching.

Figures 3, 4, 5, 6, 8:
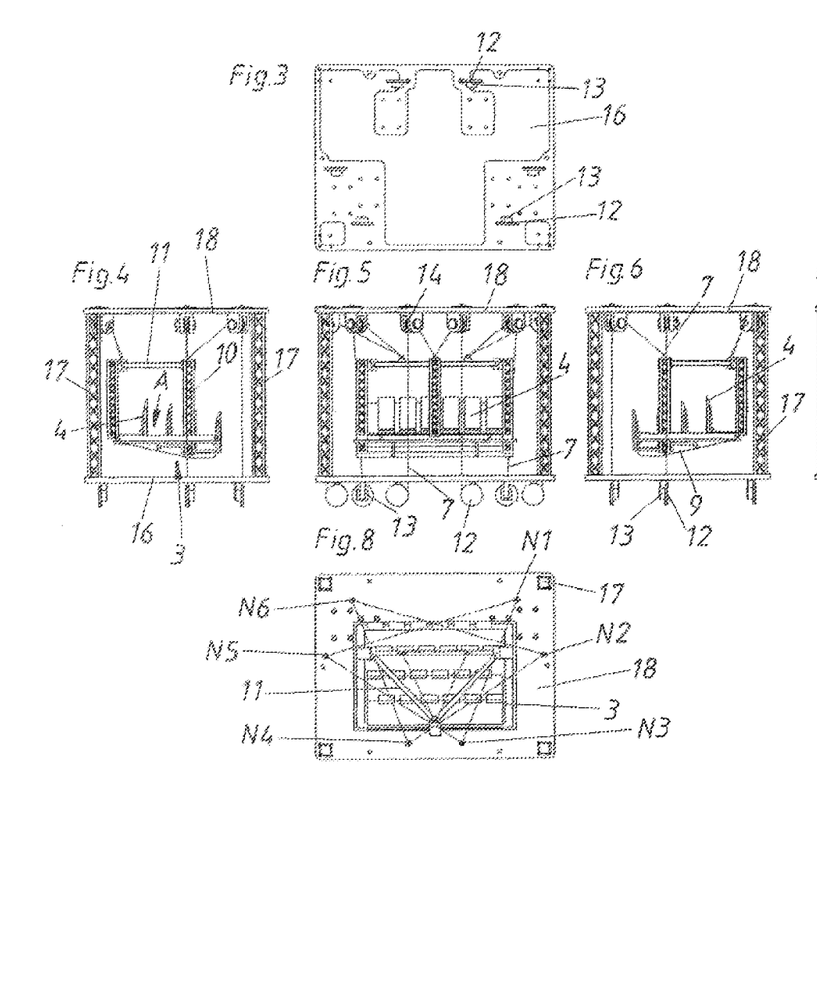
FIGS. 3 to 8 show various views of an entertainment device.
Figure 7:
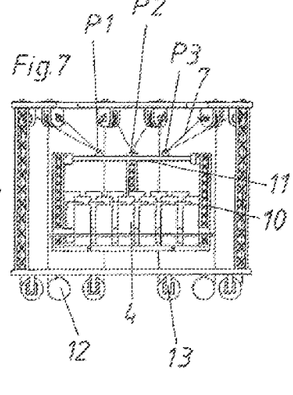
Figure 9:
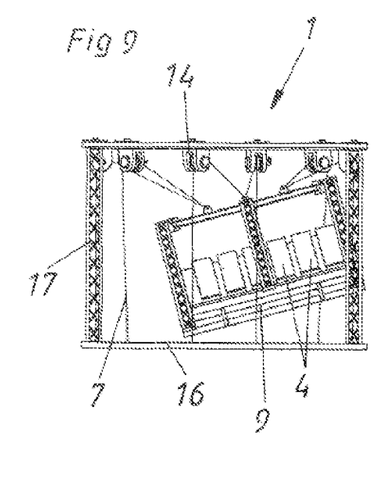
FIGS. 9 to 12 show views of an entertainment device in extreme positions.
Figure 10:
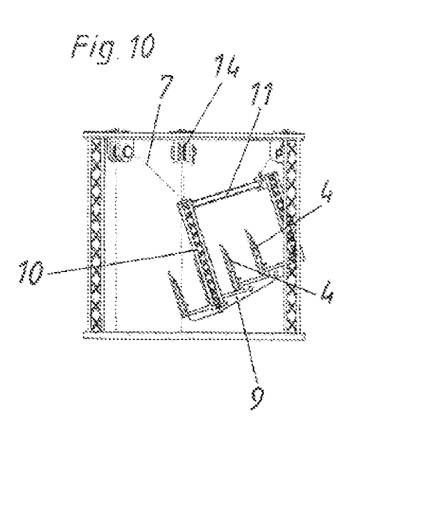
Figure 11:
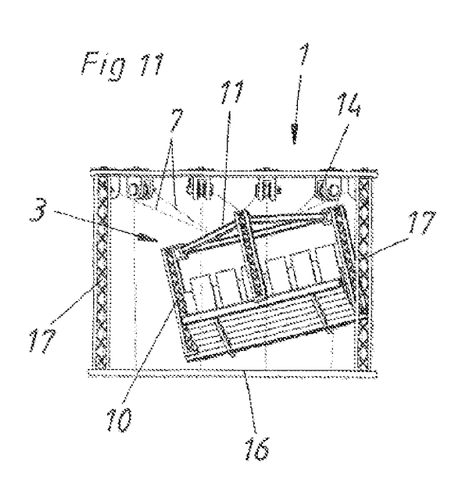
Figure 12:
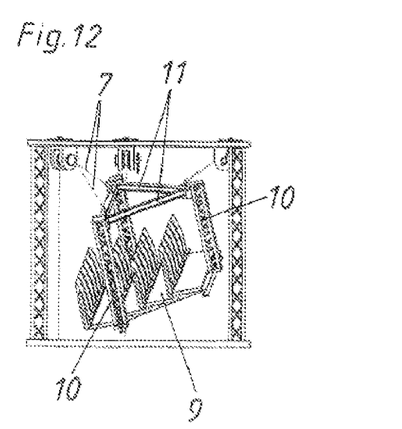

In FIG. 3, a view of the baseplate 16 from below is shown, with the cable reels 12 and the motors 13. The side views in FIGS. 4 and 6 clearly show the width of the individual viewing places A and the curved form of the supporting elements 4. In the rear view according to FIG. 5, the suspension of the simulation platform 3 by means of the cables 7 can be clearly seen. The suspension, and especially the fastening points P1, P2, P3, of the cables 7 to the cross members 11 of the simulation platform 3, are also graphically shown in the front view according to FIG. 7. In the plan view according to FIG. 8, the individual anchoring points N1 to N6 can be clearly seen. Since the simulation platform 3 is suspended by means of the cables 7 and is also controlled by them, the simulation for the user is even more realistic, since the cable technique allows the movements to be made smoother. The system may be based on six "Dyneema" cables of high-strength polyethylene fibers, which are driven and positioned by means of the servomotors 13. However, steel cables are preferably used. The various positions that can be moved to allow any desired spatial point to be moved to without any jerky movements of the simulation platform 3 occurring. A further positive aspect is that curved movements can be controlled technically better. In keeping with this, extreme positions of the simulation platform 3 in relation to the frame 15 are represented in FIGS. 9 to 12. Depending on the desired position, the respective cables 7 are wound up or unwound correspondingly.

Figure 13:
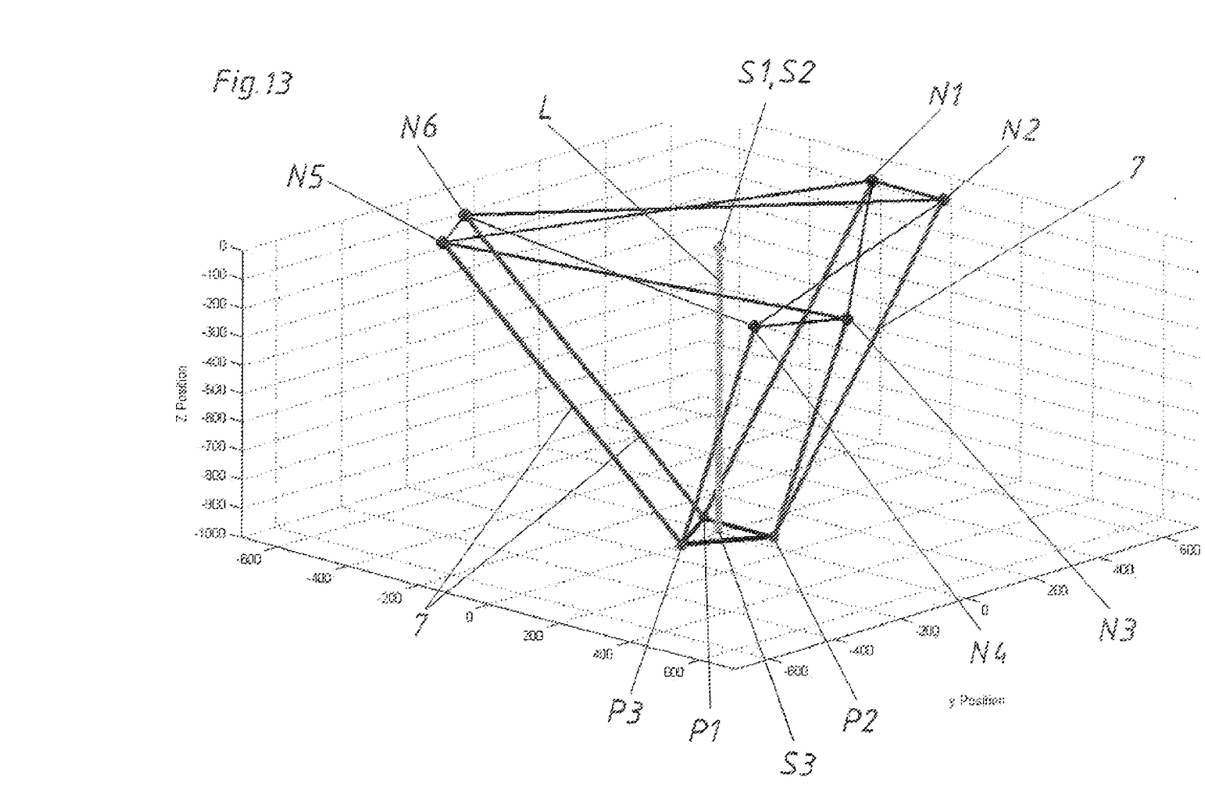
FIGS. 13 to 15 schematically show the cable suspension.

In FIG. 13, it can be seen in a 3D representation how the exact positioning and suspension of the simulation platform 3 takes place by means of six cables 7. At one end, the cables 7 are fastened here to the simulation platform 3 in the form of a triangle. For the six cables 7 there are three fastening positions P1, P2 and P3. The cables 7 that come from the anchoring points N5 and N4 are both fastened at the fastening point P3. The two cables 7 that run via the anchoring points N2 and N3 are fastened at the fastening point P2, while the cables 7 that run via the anchoring points N1 and N6 are attached at the fastening point P1. The anchoring points N1 to N6 are in this case arranged in a horizontal plane. Here, the anchoring points N1, N3 and N5 and also the anchoring points N2, N4 and N6 respectively form a triangle, the triangles concerned being similar to one another and having the same center of gravity S1 or S2, respectively. These centers of gravity S1 and S2 are also located in a vertical line L to the center of gravity S3 of the triangle, which is formed by the fastening points P1, P2 and P3. This 6-axis simulation platform allows complex spatial movements to be carried out. By means of a fastening head (cross member 11), to which two cables 7 are respectively fastened by means of the fastening points P1, P2 and P3, the entire simulation platform 3 can not only be positioned in the X, Y and Z directions and tilted about the X and Y axes, but also be turned within a limited range about the Z axis. The variable cable lengths are accomplished by winding up and unwinding on the driven cable reels 12.

The geometrical arrangement of the anchoring points N on the base plane and also the arrangement of the fastening points P1 to P3 on the simulation platform 3 are based on the corner points of similar triangles of which the centers of gravity S1, S2 and S3 lie on a vertical line L. The respective triangles are preferably equilateral.

Figure 14:
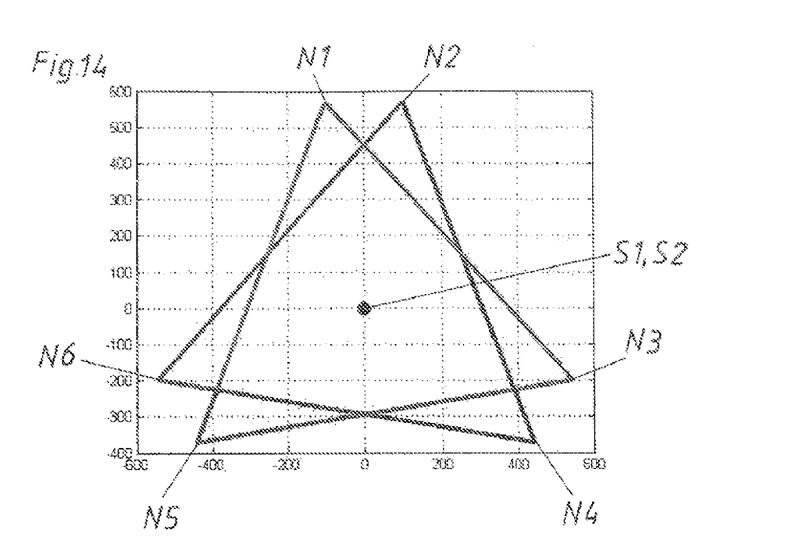
Figure 15:
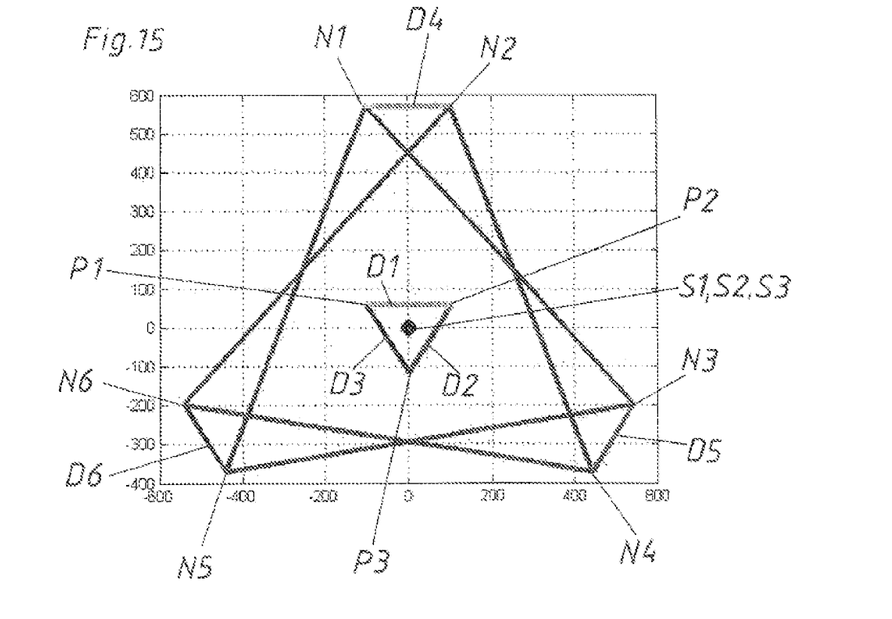

This is also evident from FIGS. 14 and 15. It can be seen in particular from FIG. 15 that the distance between the anchoring points N3 and N4 and the distance between the fastening points P2 and P3 are equal. The same applies to the distances between the anchoring points N5 and N6 and the fastening points P3 and P1 or the anchoring points N1 and N2 and the fastening points P2 and P1. However, in principle, it only has to be provided that the ratio of the distance D4 to the distance D1, the ratio of the distance D5 to the distance D2 and the ratio of the distance D6 to the distance D3 are equal or coincide. In this case (FIG. 15), this ratio is in each case 1:1. The fastening triangle P1, P2 and P3 can therefore also be increased or reduced in size by a specific factor. This triangle can take any actual form desired here.

Figure 16:
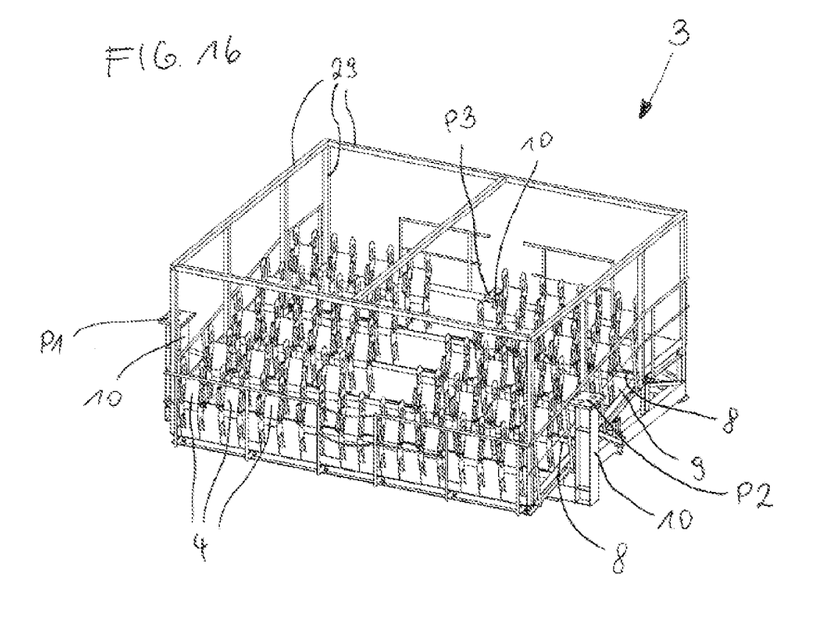
FIG. 16 shows a further exemplary embodiment of the simulation platform.

A further variant of an embodiment of the simulation platform 3 is shown in FIG. 16. In it, three half-height vertical uprights 10 are connected to the baseplate 9 of the simulation platform 3. Since the three vertical uprights 10 directly form the fastening points P1, P2 and P3, it is possible to dispense with the cross members 11. In principle, the vertical uprights 10 could also be omitted and the cables 7 fastened directly to the baseplate 9. The simulation platform 3 additionally has a frame construction 29, which however may be used especially for enclosing or darkening purposes, and does not serve for suspension. In FIG. 16 it can once again be seen well that the baseplate 9 is formed with stairs or steps, with the steps 8, which ensures a good view of the screen 2 from each supporting element 4.

Consequently, an entertainment device 1 that is improved in comparison with the prior art is provided by the present invention, the movement of the simulation platform 3 being cable-guided, whereby the stability, accuracy and efficiency of the drive is increased and the perception of the user is intensified, in that the feeling of being part of the film is enhanced.

The invention claimed is:
1. An entertainment device, comprising:
a screen on which a film can be shown;
cables;
a movable simulation platform suspended from said cables;
a multiplicity of viewing places disposed on said simulation platform, each of said viewing places having a supporting element for spectators to lean against;
a drive device for moving said cables to move said simulation platform; and
a controlling or regulating unit for controlling or regulating movement of said simulation platform, said movable simulation platform being movable by said drive device under control of said controlling or regulating unit, in dependence on a motion data track corresponding to the film.

2. The entertainment device according to claim 1, wherein said simulation platform has a base plate and a plurality of lateral uprights.

3. The entertainment device according to claim 2, wherein said base plate has steps, said lateral uprights have upper regions, and cross members interconnect said upper regions of said uprights.

4. The entertainment device according to claim 1, which further comprises cable reels each associated with a respective one of said cables, said drive device having at least two motors each driving a respective one of said cable reels.

5. The entertainment device according to claim 1, which further comprises cable reels and deflecting rollers, each of said cables having one end being wound and unwound on a respective one of said cable reels, having another end being fastened to said simulation platform, and running over a respective one of said deflecting rollers between said respective cable reel and said simulation platform.

6. The entertainment device according to claim 5, wherein said simulation platform has three fastening points, said cables include six cables, and each two of said six cables are fastened together to a respective one of said fastening points.

7. The entertainment device according to claim 6, which further comprises six anchoring points for said cables lying substantially in a horizontal plane.

8. The entertainment device according to claim 7, wherein said six anchoring points are disposed on said deflecting rollers.

9. The entertainment device according to claim 7, wherein said six anchoring points include a first three anchoring points each being assigned to a different respective one of said fastening points, and a second three anchoring points each being assigned to a different respective one of said fastening points, and said three fastening points form three similar or equilateral triangles.

10. The entertainment device according to claim 9, wherein said three triangles have centers of gravity lying on a vertical line.

11. The entertainment device according to claim 1, which further comprises a frame having a base plate, a plurality of lateral uprights, and a top element, said simulation platform being moved within said frame in dependence on the motion data track corresponding to the film.

12. The entertainment device according to claim 11, which further comprises deflecting rollers, at least one of said deflecting rollers being associated with each respective one of said cables and being rotatably mounted on said frame.

13. The entertainment device according to claim 12, wherein said deflecting rollers are rotatably mounted on said top element.

14. The entertainment device according to claim 11, wherein said drive device is disposed underneath said base plate.

15. The entertainment device according to claim 1, which further comprises a film projector attached to said simulation platform for showing the film.

16. The entertainment device according to claim 1, wherein said screen is connected to said simulation platform.

17. The entertainment device according to claim 1, wherein said controlling or regulating unit has a storage device in which the motion data track is stored.

18. The entertainment device according to claim 17, wherein a film data track from which the film can be played is also stored in said storage device in parallel with the motion data track.

19. The entertainment device according to claim 18, wherein said storage device is a mobile data carrier.

20. The entertainment device according to claim 19, wherein said mobile data carrier is a CD or DVD.

21. A movie theater, comprising an entertainment device according to claim 1.

22. The movie theater according to claim 21, which further comprises:
   a first level;
   a second level at a different height than said first level;
   an ingress area disposed at said first level and permitting access to said simulation platform; and
   an egress area disposed at said second level and permitting departure from said simulation platform;
   said simulation platform being vertically movable between said ingress area and said egress leaving area.

23. The entertainment device according to claim 1, wherein said simulation platform has open sides.

24. The entertainment device according to claim 1, wherein said drive device has motors winding and unwinding said cables in dependence on the motion data track corresponding to the film, said motors being disposed away from said simulation platform.

25. The entertainment device according to claim 1, wherein said movement of said simulation platform in dependence on the motion data track corresponding to the film includes a vertical movement.

26. The entertainment device according to claim 1, wherein said simulation platform is exclusively supported by said cables without tracks.

27. The entertainment device according to claim 1, wherein said simulation platform is freely suspended in space by said cables.

28. The entertainment device according to claim 1, wherein said supporting element accommodates standing spectators.

* * * * *